C. ADAMS.
Saw-Teeth.

No. 204,697. Patented June 11, 1878.

Witnesses:
Frank Hirsch
Chas. Bennett

Inventor:
Calvin Adams
by Michael J. Stark
atty.

UNITED STATES PATENT OFFICE.

CALVIN ADAMS, OF RUSSELLSBURG, PENNSYLVANIA.

IMPROVEMENT IN SAW-TEETH.

Specification forming part of Letters Patent No. 204,697, dated June 11, 1878; application filed May 16, 1878.

*To all whom it may concern:*

Be it known that I, CALVIN ADAMS, of Russellsburg, in the county of Warren and State of Pennsylvania, have invented certain new and useful Improvements on a Saw; and I do hereby declare that the following description of my said invention, taken in connection with the accompanying sheet of drawings, forms a full, clear, and exact specification, which will enable others skilled in the art to which it appertains to make and use the same.

This invention has special reference to saws; and it consists in the peculiar arrangement of parts and details of construction, as hereinafter first fully set forth and described, and then pointed out in the claims.

Figure 1:
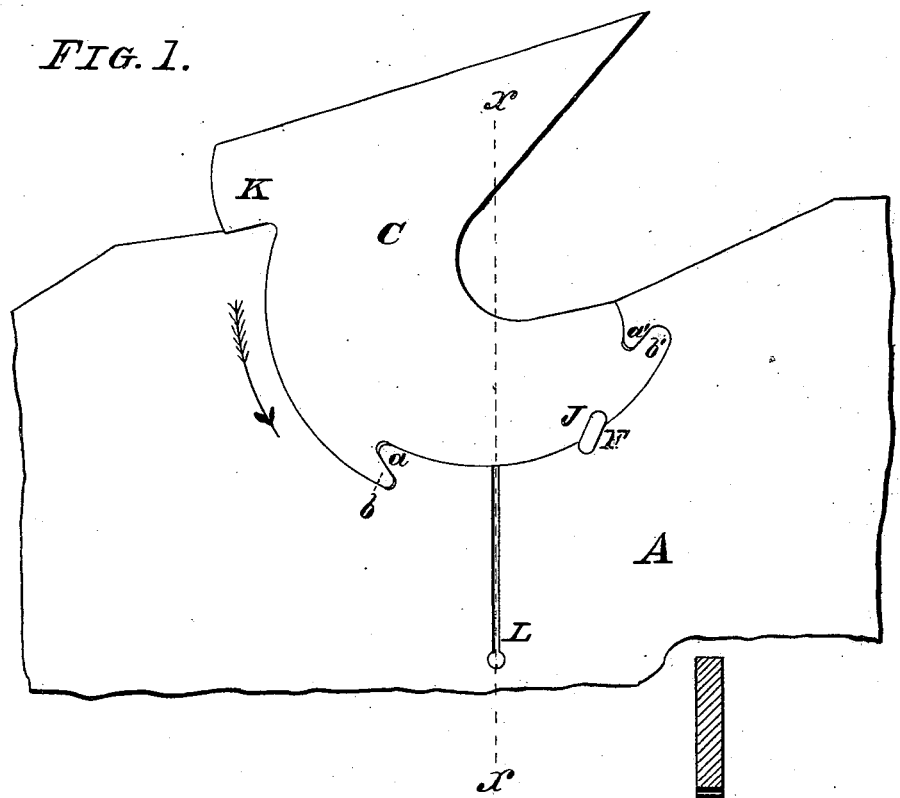
Figure 2:
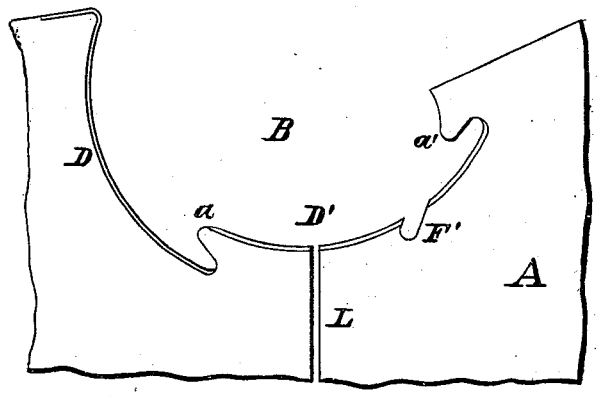
Figure 3:
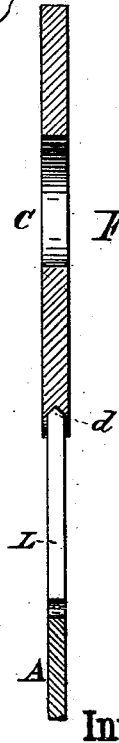

In the drawings hereinbefore mentioned, Figure 1 is a face view of a fragment of a saw-plate having my improved tooth inserted. Fig. 2 is a similar view with the tooth removed. Fig. 3 is a transverse sectional elevation in line $x\ x$ of Fig. 1.

Like letters of reference indicate corresponding parts in all the figures.

A is the saw-plate, of any of the usual forms, it being either a circular disk or a straight blade. It has in its periphery or rim a series of excisions or so-called "chambers," B, within which are inserted the saw-teeth C. Each of these chambers have several curves, D D', and projections $a\ a'$, and also a notch, F'. The edges of these curves are beveled, as shown at $d$, Fig. 3, and the circumferential edges of the teeth are grooved, to correspond with the said V-shaped edges $d$ to retain said teeth in proper position within the chambers B. The projections $a\ a'$ in the chambers B and the projections $b\ b'$ in the teeth C are somewhat wedge-shaped, so that, when these parts engage one another, and the key F, Fig. 1, is inserted into the oblong aperture formed by the notches F' and J, the tooth will be tightly wedged and locked within the chamber.

The tooth C has a wheel, K, overlapping the edge of the plate A, so as to form a stiff and strong bearing for the said tooth, and at the same time to act as a lever to contract the rim of the saw in conjunction with slots or cuts L in the said rim, said slots terminating in the chambers B.

In operation, the pressure sustained by the teeth causes them to slightly revolve in their chambers in the direction indicated by an arrow in Fig. 1. This causes the heel K to firmly press upon the rim of the saw-plate, and to wedge the projections in the plate and tooth still tighter; but after they are brought into solid contact the pressure will cause the slots L to contract, and thereby to contract the rim of the plate. This is a very important element in the construction of my saw, since it will automatically tension or stiffen the rim of the saw-plate in exact proportion to the work the teeth are called upon to perform, and will thus increase the stiffness of the rim the more work the saw has to do. The external contour of the teeth, as far as they engage the chambers, is circular, so as to permit of this slight rotation of the teeth when under the influence of pressure, as before stated.

It will be readily observed that on account of the slots L in the rim of the saw-plate, which cuts will be of a length varying with the size or diameter of said plate, this plate needs but very little hammering or stiffening in its manufacture, since the stiffening is automatically effected when the saw is in operation, and that a saw-plate of this description need not be so skillfully hammered as those now in use, which, in point of cost, materially lessens the expense of producing the saw-plate.

I prefer to use for the teeth sheet-steel of a size about one number thicker than that of the plate, and make the cuts L either in every individual or every alternate chamber, as I shall find necessary, according to the nature of the work to be performed. These cuts, in addition to the purpose already indicated, serve a still further one, which is that of allowing the expansion and contraction of the plate when heated, thereby preventing the rim from becoming untrue or dished, and at the same time to diffuse this heat, keeping the edge always perfectly straight and in good running order.

A tooth of the construction described may be either "square" or "spring" set; but in the former case I may dispense with the heel portion K, since the pressure upon that kind of tooth, being directly in line with its plane, has no tendency to force the tooth sidewise out of the chamber, as is the case with a tooth being spring-set.

Owing to the fact that in order to lock my teeth in the plate no expansive strain of any kind is put onto the rim, I am enabled to reduce the thickness of the plate and teeth to a gage far thinner than those now in use on inserted saws for the same diameter of plate, which will reduce the cost of the saw, and save considerable in wood and power to run the saw. I am furthermore enabled to insert this tooth into band-saws, which, as far as I am aware, has not heretofore been accomplished, making the diameter of the teeth and chambers sufficiently small for this purpose.

It is obvious that any number of teeth may be arranged within a plate of a given diameter, using such a number as experience has determined to be the best for the purpose for which the saw is designed.

Having thus fully described my invention, I claim as new and desire to secure by Letters Patent of the United States—

1. The combination of saw-plate A, having a chamber, B, and slot L extending inwardly therefrom, with a tooth having a projection adapted to engage with said saw-plate and clamp the same on said tooth when in operation, substantially as set forth.

2. A circular saw-plate having the chamber B and the slot L, as described, in combination with a tooth having the heel K, said tooth being held within the chamber by the V-shaped edge $d$ in said chamber and corresponding groove in the tooth, and locked in position by the wedge F, substantially as and for the purpose stated.

In testimony that I claim the foregoing as my invention I have hereto set my hand and affixed my seal in the presence of two subscribing witnesses.

CALVIN ADAMS. [L. S.]

Attest:
MICHAEL J. STARK,
FRANK HIRSCH.